Patented Dec. 4, 1934

1,982,795

UNITED STATES PATENT OFFICE 1,982,795

UREA-FORMALDEHYDE REACTION PRODUCT AND METHOD OF MAKING SAME

Melville C. Dearing, Palatine, Ill., assignor to Economy Fuse & Manufacturing Company, Chicago, Ill., a corporation of New York No Drawing. Application September 6, 1932 Serial No. 631,897

3 Claims. (Cl. 260—3)

This invention relates to a process of making condensation products from formaldehyde or its polymers and urea, thiourea or its derivatives and the products made thereby.

This invention relates particularly to a process of the above described character for making transparent or glass-like products and to the products so produced.

Products of this character are obtained by reacting urea, thiourea or its derivatives with formaldehyde or its polymers under various prescribed conditions, such as for instance, particular ratios between the proportions of formaldehyde and urea employed and also the prevailing condition of the solution at the time of reaction as to whether the solution is alkaline, neutral or acid in character.

The various conditions of reaction have been found to produce results but those processes which have proven most desirable result in the production of an initial condensation product which is found to be a soluble substance forming a solution which on standing in the atmosphere or being heat treated, is capable of being gelatinized to form a viscous intermediate product which intermediate product is capable of being finally hardened into an insoluble and infusible transparent substance.

When comparatively large masses of the gelatinous intermediate product are to be converted into the final hard insoluble and infusible substances, this is usually accomplished by means of heat treatment in which the product is heated at a temperature below the boiling point of water and upon being subjected to such heat treatment, the substance increases in hardness and strength as the heating progresses.

Considerable difficulty however, has been encountered in this hardening process, in the production of transparent substances, as it has been found that upon continuing the heat treatment, as above outlined, to the point where the material has attained its maximum hardness, that the objects so formed and treated are quite likely to crack in one or more places. The exact cause of this objectionable cracking has not been definitely ascertained but it has been believed by some, to be due to the presence of excess formaldehyde which is necessarily present in the formation of transparent articles of the type herein referred to. It has been ascertained, however, that the difficulty can not be avoided by providing excess urea to eliminate the free formaldehyde as the addition of larger quantities of urea results in the formation of products which are not clear and transparent. Attempts have been made however, acting upon the belief that the excess formaldehyde causes the undesirable cracking, to add certain substances to combine with the free formaldehyde, but then, as far as it is known, all processes which have been heretofore devised which involve introduction of some substance to combine with the free formaldehyde have not been successful in eliminating the objectionable cracking referred to, although they have reduced to some extent, the presence of bubbles which are apt to form in the products, during the hardening process.

Furthermore, processes which involve the introduction of substances to combine with the free formaldehyde require a procedure in commercial practice involving a high degree of care and in addition are accompanied by considerable danger of obtaining opaque objects rather than the transparent objects usually desired.

It is accordingly an object of this invention to overcome these objections and to provide a process by which glass-like transparent articles can be obtained, capable of being hardened to the final insoluble, infusible form without liability of the objectionable cracking.

In Patent No. 1,799,954, of Oscar A. Cherry, is described a process wherein cane sugar is added to the water soluble initial resin product of urea and formaldehyde whereby the tendency to crack is virtually eliminated. It has now been found that the addition of small quantities of gum acacia to the initial reaction, produces analogous results with the additional advantage that the initial reaction product may at the time of casting contain more water or other dispersion medium without harmful results. This is a factor, the value of which will be apparent to those skilled in the art.

In practice, after formation of the initial reaction product it is customary to eliminate as much water or other dispersion medium as is consistent with obtaining a product having the necessary fluidity for casting. In the usual products the fluidity is reduced to a minimum by distillation since an excess of water tends to increase the tendency to crack during the subsequent heat treatment. As the water is eliminated by distillation the tendency of the reaction products to gel increases and batches are sometimes spoiled by gelation before they can be poured into molds.

When practicing the process of this invention, it is unnecessary to carry the distillation to a point where gelation becomes a danger, since the addition of gum acacia has such an effect that no cracking during the hardening operation occurs even when the cast product contains a high percentage of water or other dispersion medium.

The initial water soluble product may be made in any known way but it is preferred to use the process described and claimed in United States Patent No. 1,737,918.

Thus by way of example, to one hundred and eight grams of commercial forty per cent formaldehyde the pH of which has been adjusted to 5 may be added thirty grams of urea preferably in two or more portions, and the reaction allowed to ensue before the addition of another portion. After addition of all of the urea it is preferable to boil the product under a reflux condenser for about thirty minutes. When a particularly clear water white product is desired, at this point five grams of decolorizing carbon may be added and after refluxing for a very few minutes the product may be filtered.

Just before completion of the filtration, add 0.25 grams of gum acacia in water solution. The addition may, however, be made at other stages. The filtered product may then be distilled until it has attained a syrupy consistency. This product is then poured into a mold of the desired form.

It is preferable to carry out the heat treatment at a temperature of about fifty-five degrees C. until the desired hardness has been reached. In the case of a block about three inches in thickness about forty days are required at this temperature.

The final product is hard and infusible and substantially unaffected by cold water. It is easily machined and possesses high mechanical strength.

I claim:

1. The process of producing a product suitable for casting comprising, reacting urea and aqueous formaldehyde solution, adding gum acacia to the solution, and then distilling a portion of the water from the solution until a casting consistency is reached.

2. The process of producing a cast product comprising reacting urea and aqueous formaldehyde solution, adding gum acacia to the solution, distilling a portion of the water from the solution, casting said solution and then heating to effect gelatinization while leaving a substantial amount of water in the cast product.

3. An infusible cast product comprising the reaction product of urea and an aqueous formaldehyde solution, gum acacia and a substantial amount of water.

MELVILLE C. DEARING.